(12) United States Patent
Imura et al.

(10) Patent No.: US 7,053,936 B2
(45) Date of Patent: May 30, 2006

(54) ELECTRONIC CAMERA AND PHOTOGRAPHIC INFORMATION DATA FILE MANAGEMENT METHOD

(75) Inventors: Yoshio Imura, Kawasaki (JP); Tomoaki Kawamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 696 days.

(21) Appl. No.: 10/126,690

(22) Filed: Apr. 22, 2002

(65) Prior Publication Data

US 2003/0011687 A1 Jan. 16, 2003

(30) Foreign Application Priority Data

Apr. 23, 2001 (JP) ............... 2001-124652

(51) Int. Cl.
*H04N 5/75* (2006.01)
(52) U.S. Cl. ................... 348/231.2; 348/231.3
(58) Field of Classification Search ................ 348/231, 348/333, 117, 46, 512
See application file for complete search history.

(56) References Cited

U.S. PATENT DOCUMENTS

| | | | | |
|---|---|---|---|---|
| 5,633,678 A | * | 5/1997 | Parulski et al. | 348/231.5 |
| 5,719,987 A | | 2/1998 | Kawamura et al. | |
| 6,437,811 B1 | * | 8/2002 | Battles et al. | 715/835 |
| 6,668,134 B1 | * | 12/2003 | Niikawa | 386/95 |
| 2002/0051629 A1 | * | 5/2002 | Endo | 386/113 |

FOREIGN PATENT DOCUMENTS

| JP | A 6-314176 | 11/1994 |
|---|---|---|
| JP | A 10-285517 | 10/1998 |

* cited by examiner

*Primary Examiner*—Tuan Ho
(74) *Attorney, Agent, or Firm*—Oliff & Berridge, PLC

(57) ABSTRACT

When initializing a recording medium, an ordinary folder and a lock folder are created. Photographic information files of photographed images are stored into the ordinary folder. Files the erasure of which is disabled among the photographic information files are stored into the lock folder. After a photographing operation, any image file set for a lock is erased from the ordinary folder and stored into the lock folder.

29 Claims, 17 Drawing Sheets

| FOLDER | FILENAME | ATTRIBUTE | RECORDING TIME | RECORDING DATE |
|--------|----------|-----------|----------------|----------------|
| DSC01  |          |           |                |                |
| LOCK   |          |           |                |                |

FIG.4

| FOLDER | FILENAME | ATTRIBUTE | RECORDING TIME | RECORDING DATE |
|--------|----------|-----------|----------------|----------------|
| DSC01  | 0001     | JPG       | ::       | //       |
|        | 0002     | JPG       | ::       | //       |
|        | 0003     | JPG       | ::       | //       |
|        | 0004     | JPG       | ::       | //       |
|        | 0005     | JPG       | ::       | //       |
|        | 0006     | JPG       | ::       | //       |
| LOCK   |          |           |                |                |

FIG.5

| FOLDER | FILENAME | ATTRIBUTE | RECORDING TIME | RECORDING DATE |
|--------|----------|-----------|----------------|----------------|
| DSC01  | 0002     | JPG       | ::       | //       |
|        | 0003     | JPG       | ::       | //       |
|        | 0004     | JPG       | ::       | //       |
|        | 0006     | JPG       | ::       | //       |
| LOCK   | 0001     | JPG       | ::       | //       |
|        | 0005     | JPG       | ::       | //       |

FIG.9

| FOLDER | FILENAME | ATTRIBUTE | RECORDING TIME | RECORDING DATE |
|---|---|---|---|---|
| DSC01 | 0002 | JPG | :: | // |
|  | 0003 | JPG | :: | // |
|  | 0004 | JPG | :: | // |
|  | 0006 | JPG | :: | // |
| PRINT | 0001 | JPG | :: | // |
|  | 0005 | JPG | :: | // |

FIG.11

| FOLDER | FILENAME | ATTRIBUTE | RECORDING TIME | RECORDING DATE |
|---|---|---|---|---|
| DSC01 | 0002 | JPG | :: | // |
|  | 0003 | JPG | :: | // |
|  | 0004 | JPG | :: | // |
|  | 0006 | JPG | :: | // |
| TRANSFER | 0001 | JPG | :: | // |
|  | 0005 | JPG | :: | // |

FIG.12

| FOLDER | FILENAME | ATTRIBUTE | RECORDING TIME | RECORDING DATE |
|---|---|---|---|---|
| DSC01 | 0001 | JPG | :: | // |
| | 0002 | JPG | :: | // |
| | 0003 | JPG | :: | // |
| | 0004 | JPG | :: | // |
| | 0005 | JPG | :: | // |
| | 0006 | JPG | :: | // |
| PRINT | 0001 | JPG | :: | // |
| | 0005 | JPG | :: | // |

FIG.13

| FOLDER | FILENAME | ATTRIBUTE | RECORDING TIME | RECORDING DATE | LOCK |
|---|---|---|---|---|---|
| DSC01 | 0001 | JPG | :: | // | 1 |
|  | 0002 | JPG | :: | // |  |
|  | 0003 | JPG | :: | // | 1 |
|  | 0004 | JPG | :: | // |  |
|  | 0005 | JPG | :: | // |  |
|  | 0006 | JPG | :: | // |  |

FIG.19

Related Art

ELECTRONIC CAMERA AND PHOTOGRAPHIC INFORMATION DATA FILE MANAGEMENT METHOD

The disclosure of the following priority application is incorporated herein by reference:

Japanese Patent Application No. 2001-124652 filed Apr. 23, 2001

BACKGROUND OF THE INVENTION

1. Field of the Invention

The present invention relates to an electronic camera capable of implementing folder management of filed photographic information related to electronically photographed images and a file management method adopted in folder management.

2. Description of the Related Art

There are electronic cameras in the related art that achieve functions of erasing an image data file obtained through a photographing operation and prohibiting the erasure of such an image data file (see, for instance, Japanese Laid-Open Patent Publication No. H06-314176 and Japanese Laid-Open Patent Publication No. H 10-285517).

FIG. 19 illustrates image data files stored in a recording medium of an electronic camera and a method of specifying an image data file to be locked in the related art. The method adopted to prohibit erasure of image data files in the related art is now explained in reference to this figure. Image data files obtained through photographing operations are assigned with filenames 0001, 0002, 0003, . . . in the order in which they are obtained and are stored into an ordinary folder DSC01 created in a recording medium such as a flash memory. In each image data file, information such as the attributes and the recording date is also recorded. In order to ensure that these image data files are not erased by mistake, a lock flag is set for an image data file for which erasure is to be prohibited, as shown in the figure, for instance, and thus, any file at which the lock flag is set is not erased in the image erasure mode.

However, there are locked files, i.e., erase-prohibited files and ordinary files coexisting in an ordinary folder in the electronic camera in the related art. For this reason, the locked files among numerous image data files must be verified through a complicated and time-consuming process, resulting in poor operability.

SUMMARY OF THE INVENTION

An object of the present invention is to achieve an improvement in the method adopted to manage photographic information files containing the photographed image and sound recorded during the photographing operation.

The electronic camera according to the present invention comprises a folder creation means for creating an ordinary folder in which photographic information files of photographed images are stored and a special folder corresponding to a processing purpose for the photographic information file and a folder storage means for storing into the special folder a photographic information file for which the processing purpose has been set.

In the electronic camera, the special folder may be created while initializing a recording medium.

If the camera includes a first operating member that sets the processing purpose for photographic information file after a photographing operation and a processing purpose setting operation has been performed through the first operating member, a special folder may be created to correspond to the processing purpose that has been set. In this case, if the processing purpose is set through the first operating member for a specific photographic image file among those having been recorded in the ordinary folder, the folder storage means should preferably move or copy the specified photographic image file from the ordinary folder to the corresponding special folder.

If the camera includes a second operating member that sets a processing purpose for photographic information file prior to a photographing operation, a processing purpose setting operation has been performed through the second operating member, a special folder may be created to correspond to the processing purpose that has been set. In this case, it is desirable that the folder storage means records a photographic information file of a photographed image into the special folder corresponding to the processing purpose set through the second operating member after photographing the operation.

It is desirable that the electronic camera includes a reproduction mode setting means for setting a reproduction mode for individually displaying photographic information files stored in the special folder or displaying the photographic image files stored in the special folder in a batch and a menu display means for bringing up a menu display by excluding a processing menu matching the processing purpose set for the special folder from photographic information file processing menus or bringing up a menu display by placing the processing menu matching the processing purpose at a low position in the display priority order if the reproduction mode is currently set.

In a photographic information file management method to be adopted in an electronic camera according to the present invention, an ordinary folder in which photographic image files of photographed images are stored is created, a special folder is created in correspondence to a processing purpose for photographic information file and any photographic information file for which the processing purpose is set is stored into the special folder.

The special folder may be any one of; a lock folder in which locked photographic image files, i.e., erase-prohibited image files, are stored, a print folder in which photographic image files to undergo print processing are stored and a transfer folder in which photographic image files to be transferred to an external apparatus are stored or the special folder may be constituted so as to achieve the combined functions of a plurality of folders.

BRIEF DESCRIPTION OF THE DRAWINGS

FIG. 4 presents an example of information recorded in the directory at the recording unit;

FIG. 5 shows the directory indicating that photographic data files obtained through photographing operations have been stored into the ordinary folder;

FIG. 9 shows the directory indicating that photographic data files having been set for a lock are now stored in the lock folder;

FIG. 11 shows the directory indicating that a "print" folder has been created in addition to the ordinary folder;

FIG. 12 shows the directory indicating that a "transfer" folder has been created in addition to the ordinary folder;

FIG. 13 shows the directory indicating that a "print" folder has been created by copying photographic data files in the ordinary folder;

FIG. 19 illustrates image data files stored in a recording medium of an electronic camera and a method of specifying an image data file to be locked in the related art.

DESCRIPTION OF THE PREFERRED EMBODIMENTS (First Embodiment of the Invention)

Figure 1:
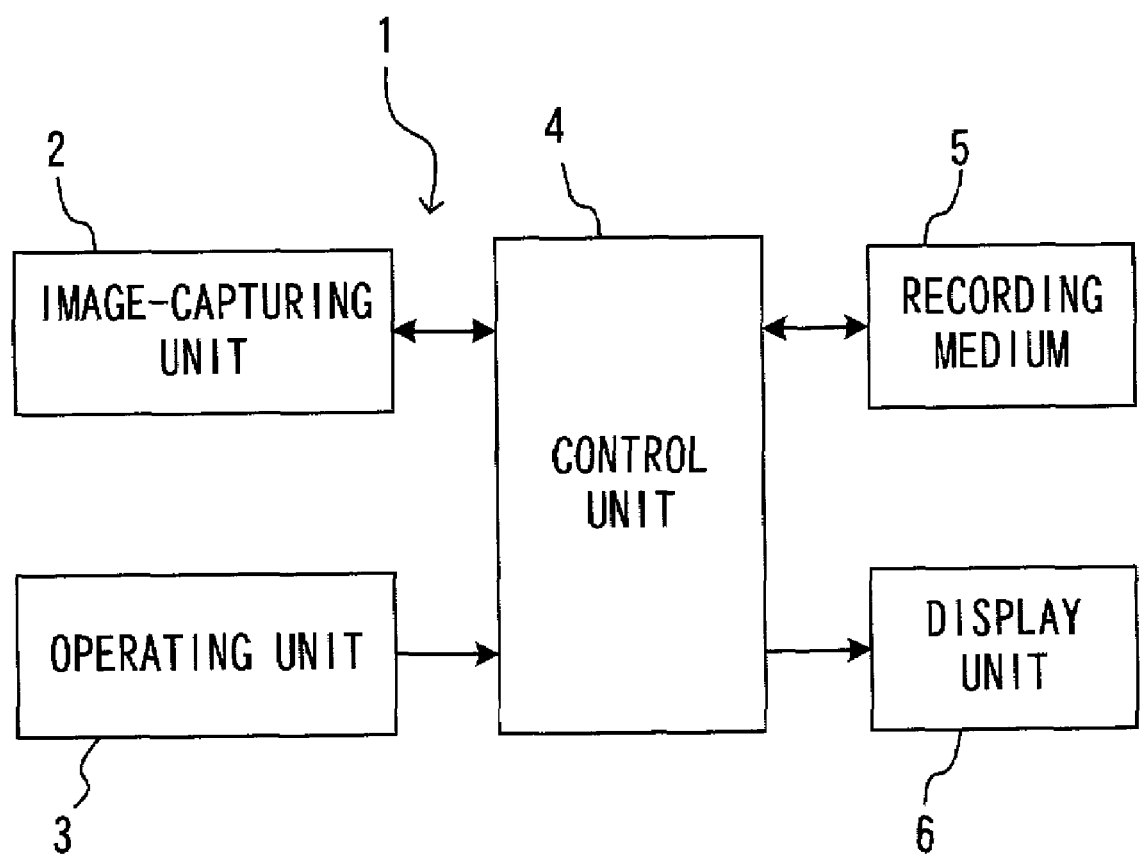
FIG. 1 is a control block diagram of the electronic camera achieved in a first embodiment.

FIG. 1 is a control block diagram of the electronic camera achieved in the first embodiment. An electronic camera 1 in the first embodiment comprises an image-capturing unit 2 that includes a photographic lens and a solid image-capturing element, an operating unit 3 at which the photographer performs photographing-related operations, a control unit 4 that implements photographic data file management in addition to implementing focal adjustment control and exposure control for the image-capturing unit 2, a recording medium 5 such as a flash memory that records photographed images, an LCD display unit 6 at which captured images and photographic information are displayed and the like. The recording medium 5 may be a removable recording medium or it may be internally provided in the camera.

Figure 2:
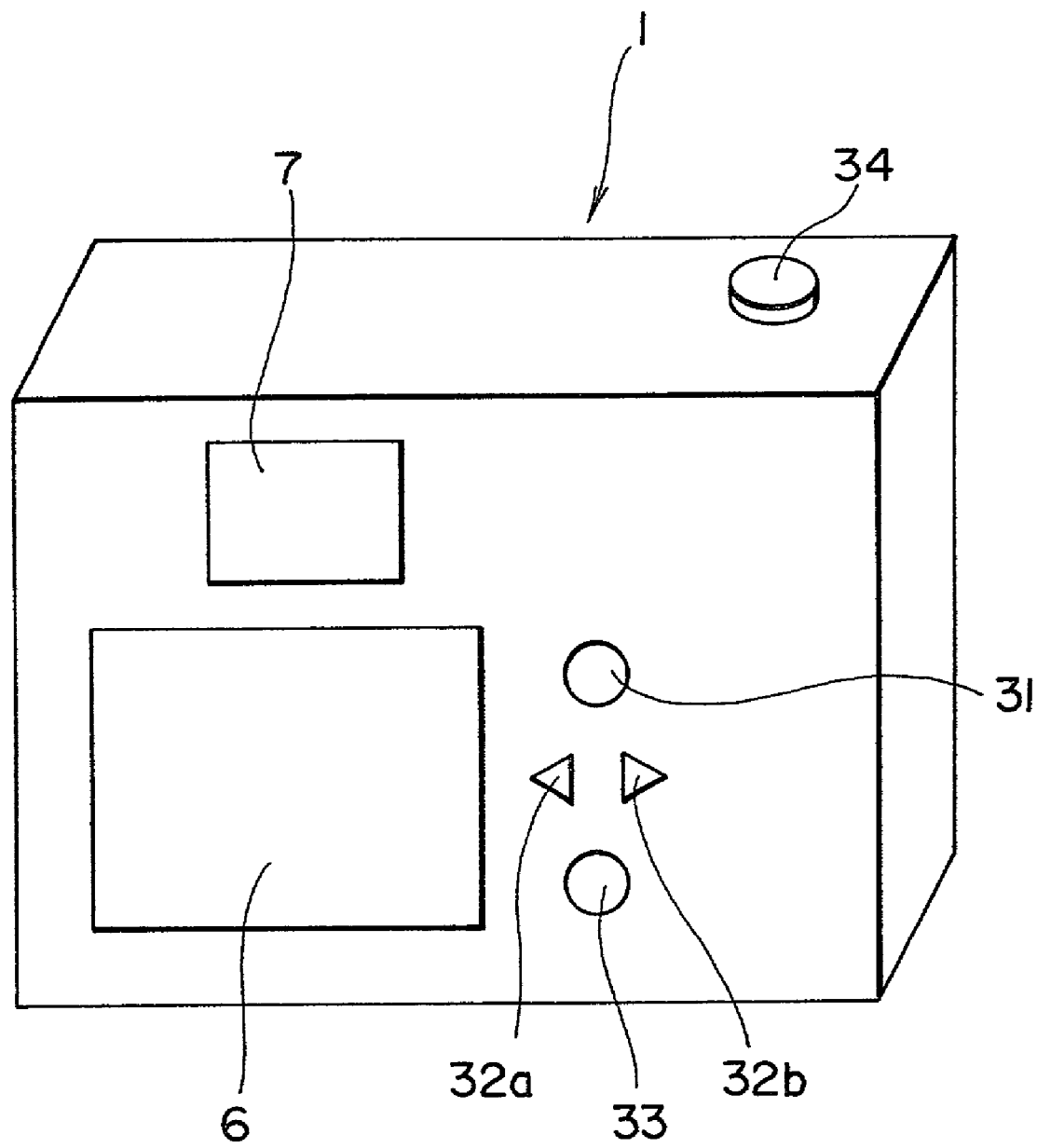
FIG. 2 presents a rear view of the electronic camera.

FIG. 2 is a perspective of the electronic camera 1 viewed from the rear. At the rear surface of the electronic camera 1, the LCD display unit 6, a viewfinder eyepiece window 7 and various switches of the operating unit 3 are provided. A switch 31 is operated to select a photographing mode, and switches 32a and 32b are operated to move the cursor displayed at the LCD display unit 6 up and down and to the left and the right. A switch 33 is operated to set the photographing mode and the data indicated by the cursor. A switch 34 is a shutter release switch.

It is to be noted that while a subject is photographed and the photographed image is recorded as photographic data into the recording medium 5 in the embodiment, sound may be recorded while photographing the subject so as to store both the photographed image and the recorded sound as photographic data into the recording medium 5. While the recording medium 5 is constituted of flash memory in the example, the recording medium in which the photographic data are recorded does not need to be flash memory and instead, the recording medium may be a CD or the like.

Figure 3:
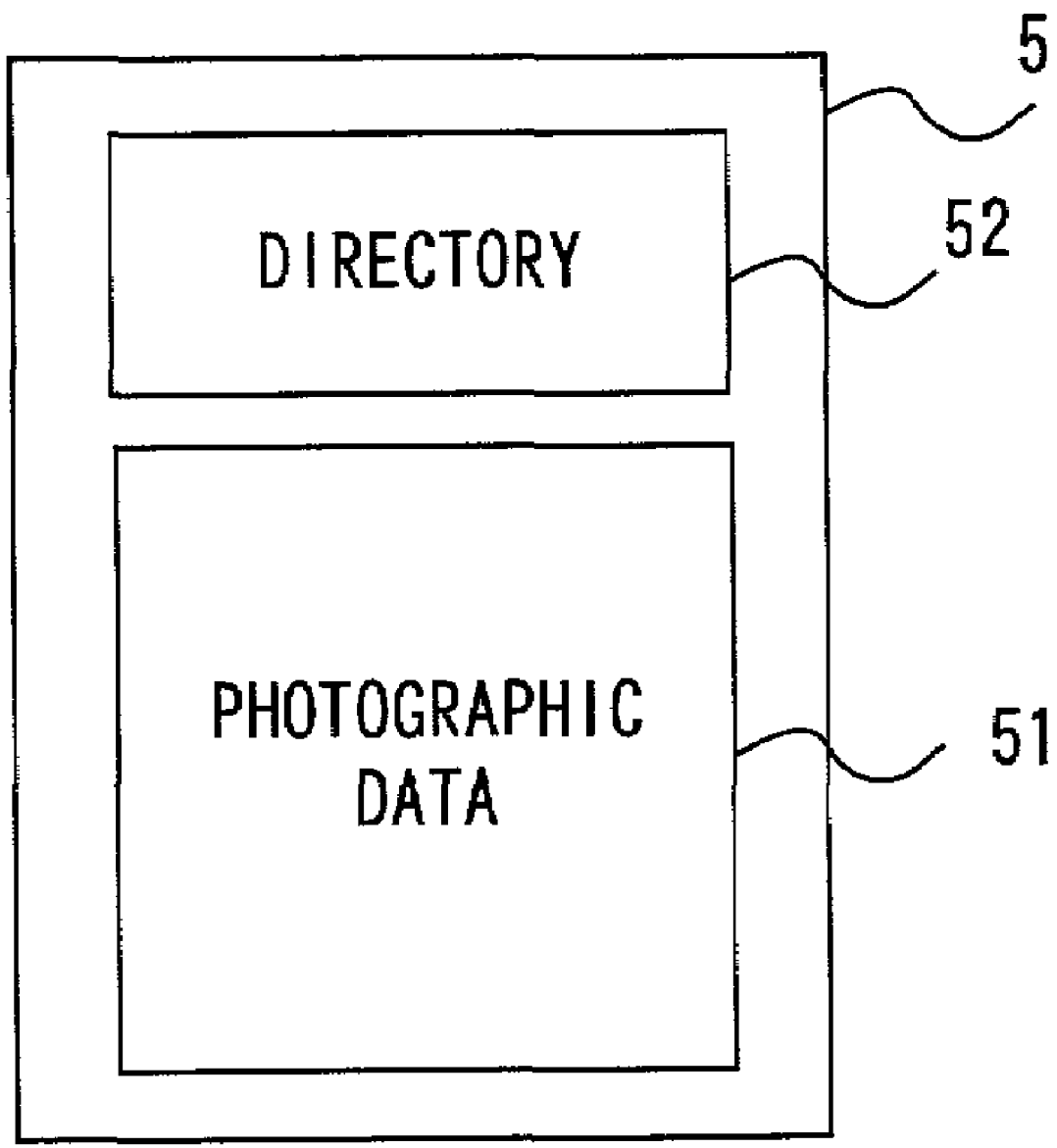
FIG. 3 shows the recording area in a recording unit.

FIG. 3 schematically illustrates the recording area in the recording medium 5. In the flash memory recording medium 5, there are an area 51 where data obtained by photographing images are recorded and an area 52 of directory used for photographic data file management.

FIG. 4 presents an example of information recorded in the directory 52 at the recording medium 5. The control unit 4 creates two folders, i.e., a "DSC01" folder and a "lock" folder while initializing (formatting) the recording medium 5. The DSC01 folder is an ordinary folder in which photographic data files are stored, whereas the lock folder is a special folder for storing photographic data files the erasure of which is prohibited.

The recording medium 5 may be initialized in the following manner. A menu screen is brought up on display at the display unit 6 by operating the operating unit 3. In the menu screen, information with regard to the initialization of the recording medium 5 is displayed. The photographer selects and executes the initialization by operating the operating unit 3.

Figure 14:
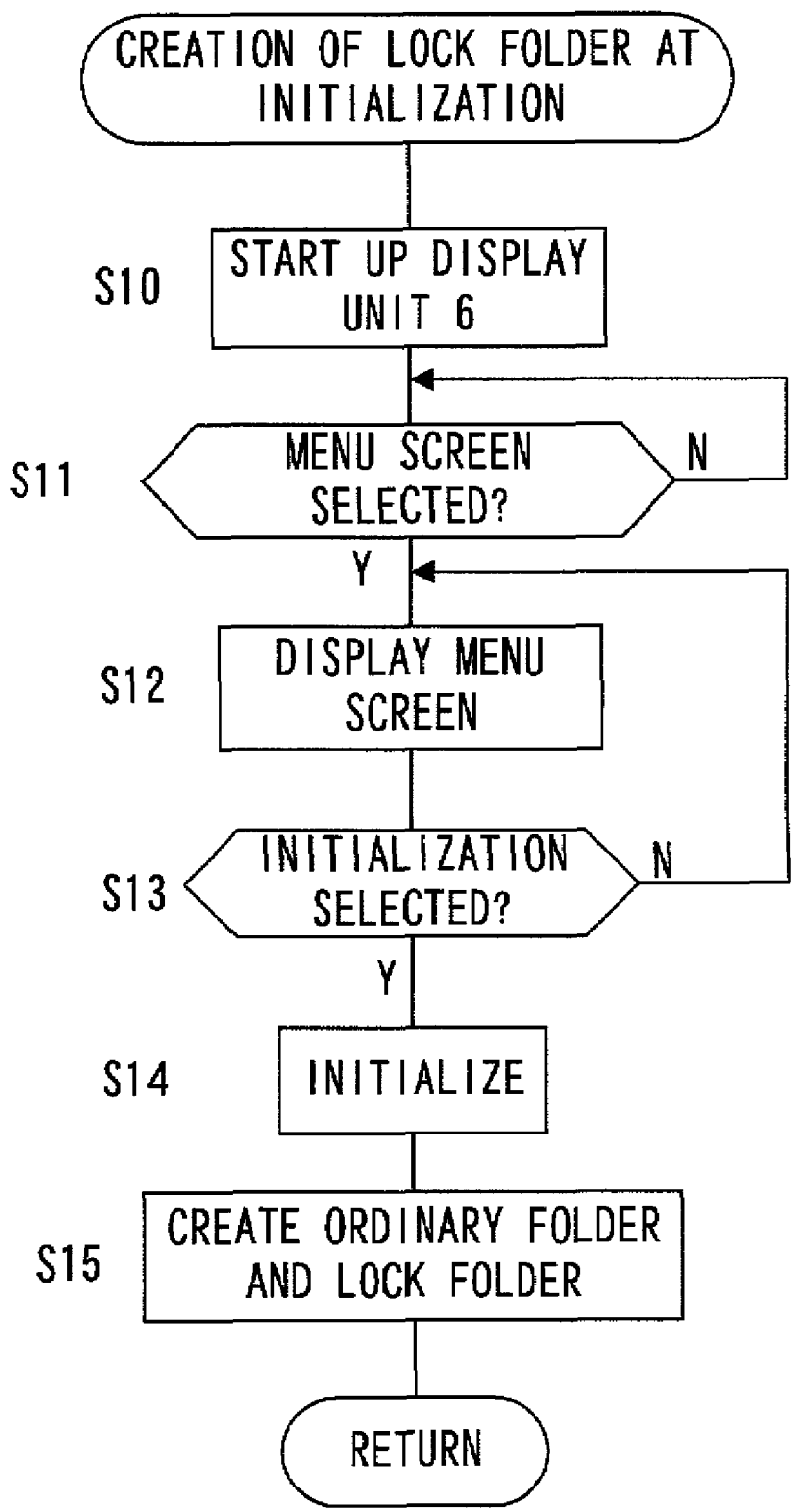
FIG. 14 presents a flowchart of an example of the procedure implemented to create an ordinary folder and a lock folder in a recording medium during an initialization process.

FIG. 14 presents a flowchart of the procedure of the program executed by the control unit 4 when initializing the recording medium 5. In step S10, the display unit 6 is started up. Following step S11, in which the menu screen is selected, the menu screen is brought up on display at the display unit 6 in step S12. After initialization is selected in step S13, the recording medium 5 is initialized in step S14 and the ordinary folder and the lock folder are created in the recording medium 5 in step S15.

FIG. 5 shows the directory 52 indicating that photographic data files obtained through photographing operations have been stored into the ordinary DSC01 folder. In the example, six files assigned with filenames 0001~0006 have been stored in the ordinary DSC01 folder.

Next, an explanation is given on the method adopted in the embodiment to disable erasure of photographic data files. While it is a common practice to delete files that do not need to be saved among the photographic data files recorded in the ordinary folder at the recording medium 5, the following procedure is taken to move files that are not to be erased to the lock folder in order to prevent accidental deletion of necessary files.

Figure 6:
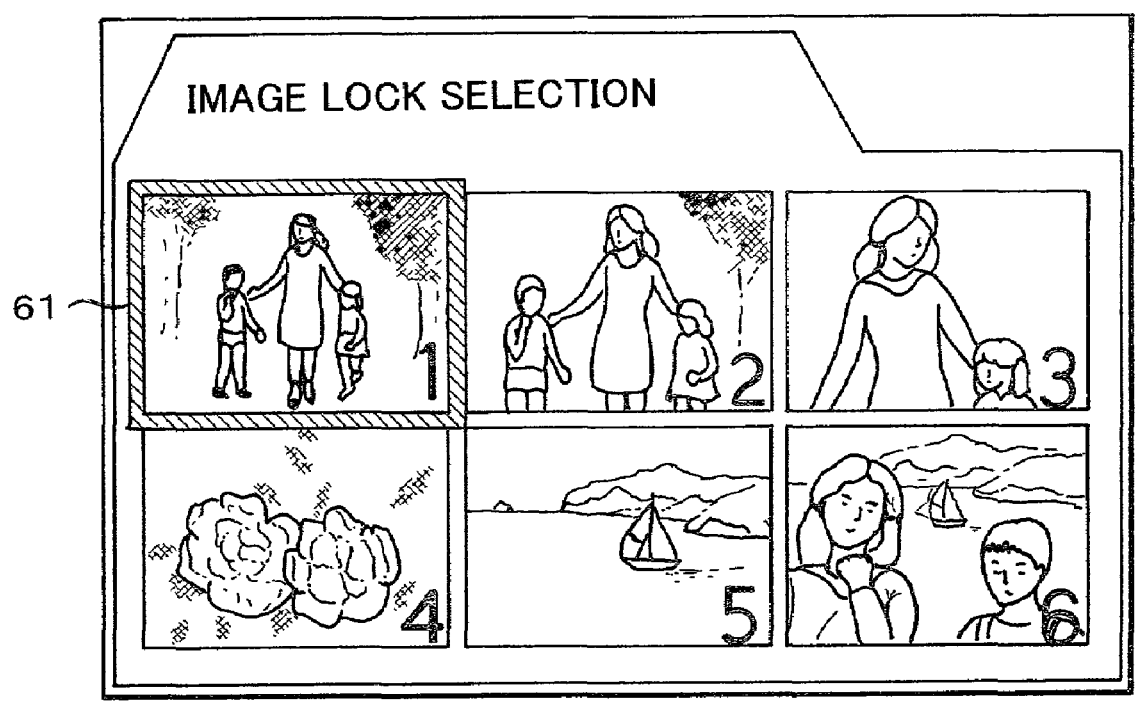
FIG. 6 shows the "image lock selection" screen.

First, through the operating switches 31~33 at the operating unit 3, an "image lock selection" mode is selected. At this time, the photographed images are brought up on display at the LCD display unit 6, as shown in FIG. 6. In this example, six images corresponding to first through sixth frames are displayed all at once. An image to be locked is selected from the six images by operating the cursor moving switches 32a and 32b to move a frame cursor 61 which encloses an image to an image that the photographer wishes to protect.

Figure 7:
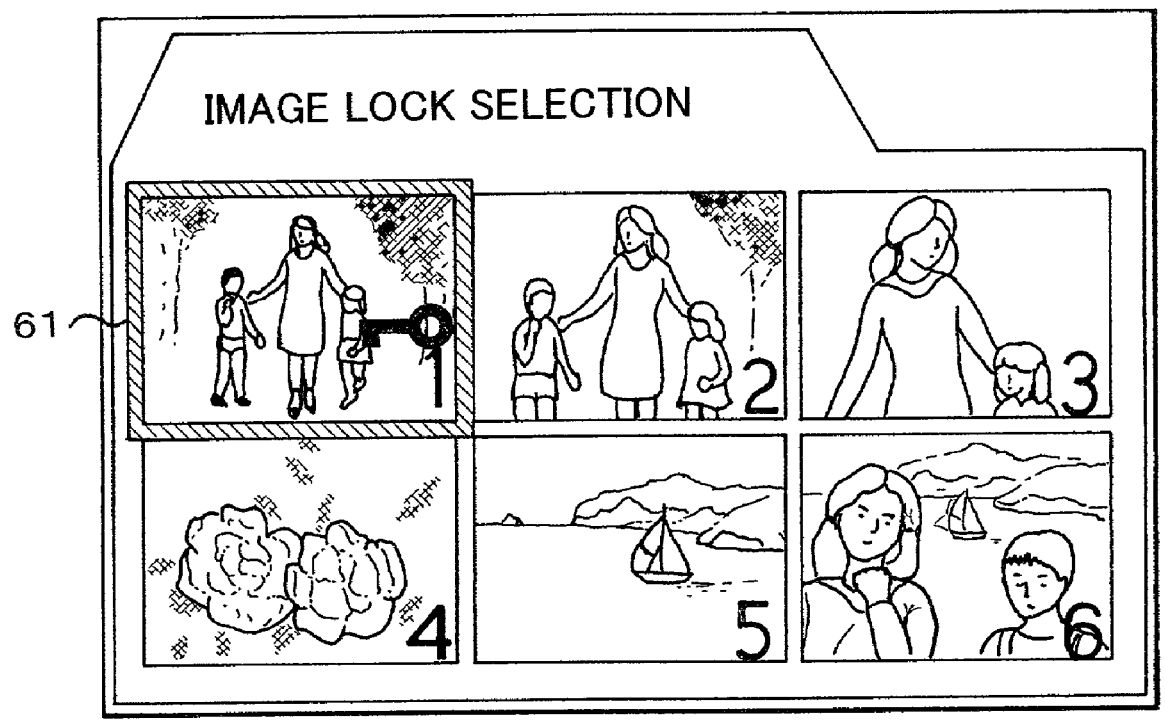
FIG. 7 shows the "image lock selection" screen with lock set for the first frame.
Figure 8:
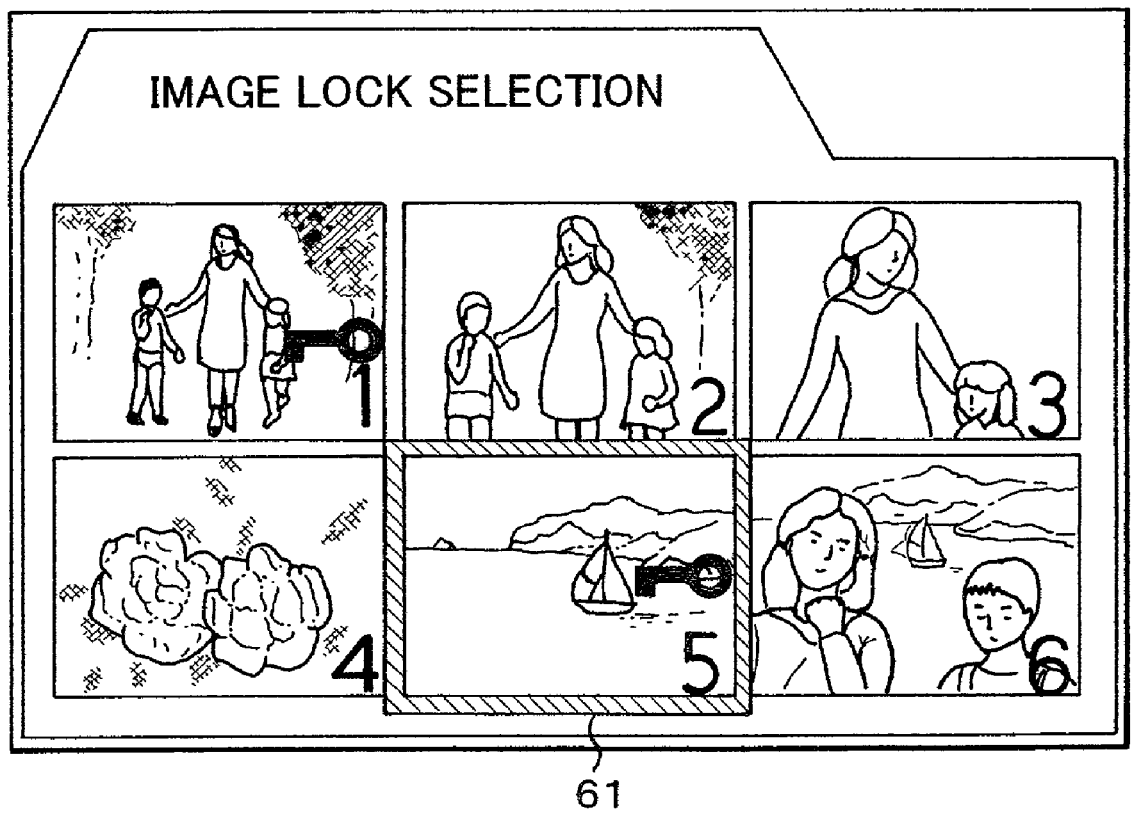
FIG. 8 shows the "image lock selection" screen with a locked set for the fifth frame.

In FIG. 6, the image in the first frame has been selected. If the setting switch 33 is operated in this state, a key mark is displayed at the first frame as shown in FIG. 7, thereby setting a lock for the photographic data file corresponding to the first frame. Likewise, if the frame cursor 61 is moved to the fifth frame and a setting operation is performed, the key mark is displayed at the fifth frame, as shown in FIG. 8, thereby setting a lock for the photographic data file corresponding to the fifth frame.

Figure 15:
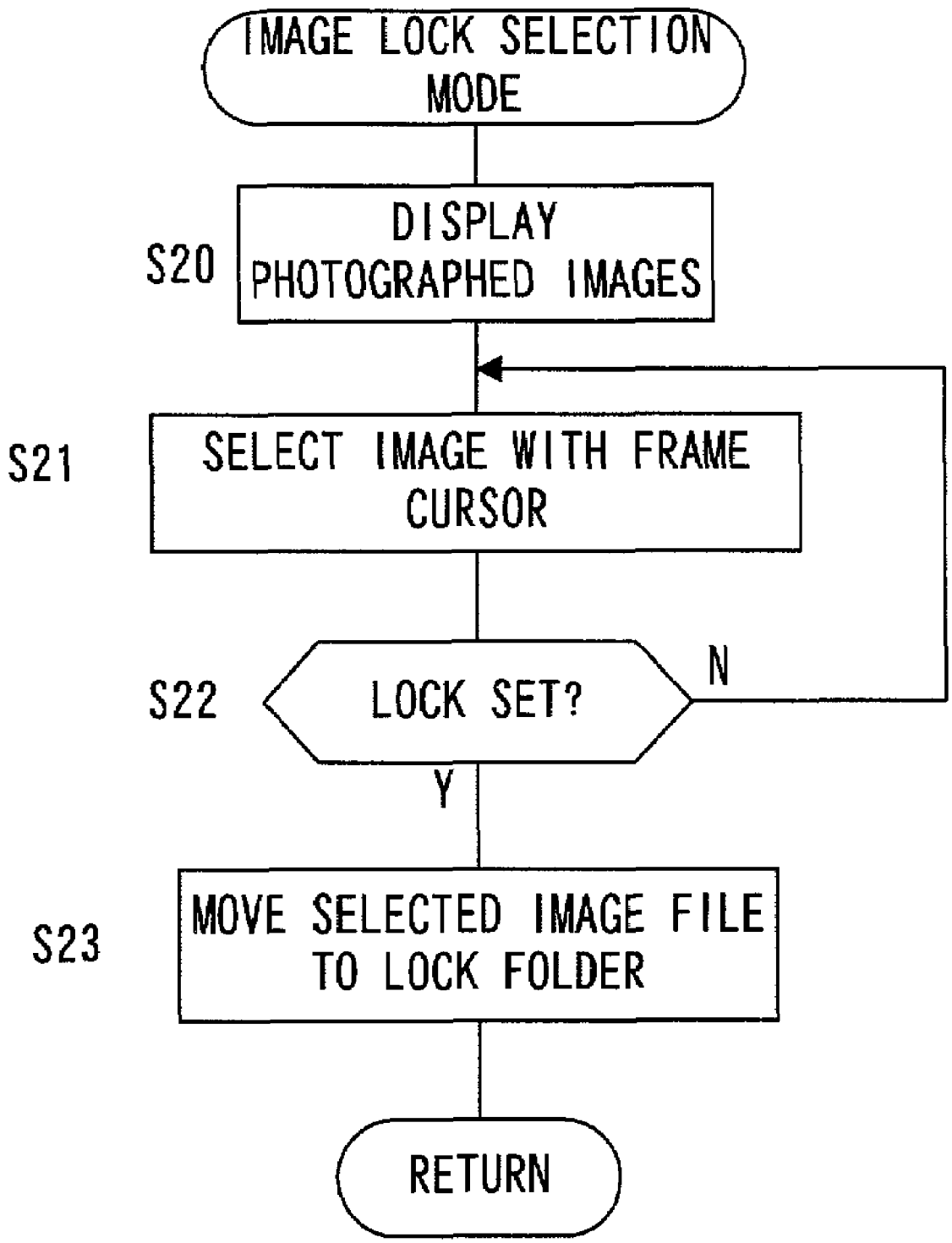
FIG. 15 presents a flowchart of an example of the procedure implemented in the image lock selection mode.

Now, an explanation is given on the method of specifying a file to be locked in reference to the flowchart in FIG. 15.

Once the "image lock selection" mode is selected, the photographed images are brought up on display at the LCD display unit 6 in step S20, as shown in FIG. 6. In step S21, the frame cursor 61, which encloses an image, is moved to the image that the photographer wishes to protect. If it is decided in step S22 that the setting switch 33 has been operated, the image that the photographer wishes to protect is relocated to the lock folder in step S23.

Figure 10:
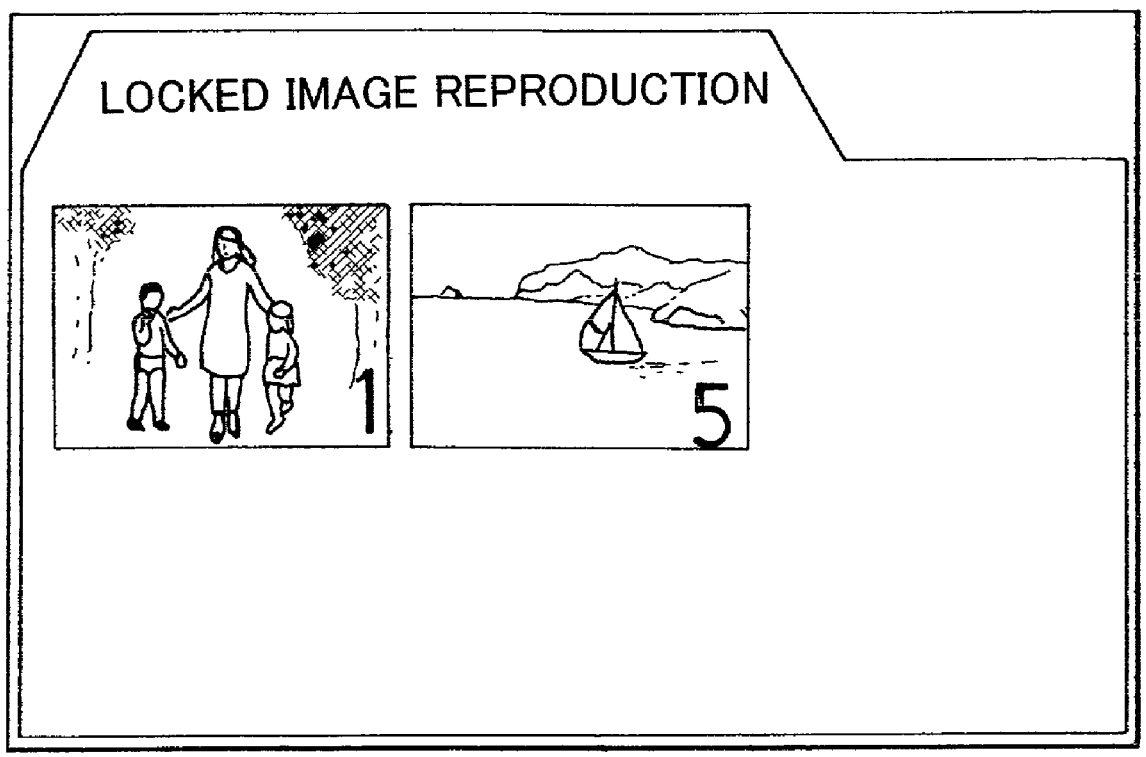
FIG. 10 presents an example of screen display brought up in the locked image reproduction mode.

FIG. 9 shows the directory 52 indicating that a lock has been set for the first and fifth frames. The directory 52 indicates the photographic data files 0001 and 0005 corresponding to the first frame and the fifth frame that have both been relocated from the ordinary DSC01 folder to the lock folder. If the reproduction mode for displaying the locked images in a batch, i.e., a locked image reproduction mode, is selected through the operating unit 3 at this point, the images in the first frame and the fifth frame selected for the lock are brought up on display at the LCD display unit 6 as shown in FIG. 10.

It is to be noted that various menus related to image processing such as a "delete" menu for erasing images, a "print specify" menu for specifying that images are to be printed and a "non-display setting" menu for not displaying images can be selected in the reproduction mode, and individual menu screens can be brought up on display by operating the menu button (not shown) at the operating unit 3 as appropriate. However, the "delete" menu is basically not necessary in the reproduction mode in which locked images are reproduced and displayed as shown in FIG. 10. Therefore, the "delete" menu is either not displayed or displayed after the other menus such as the "print specified" menu and the "non-display setting" menu, so that in the menu display in the locked image reproduction mode shown in FIG. 10, menus likely to be selected can be displayed with higher display priority ultimately to assure better operability.

As explained above, in the electronic camera 1 having the recording medium 5 in which a plurality of photographic data files are recorded, the special "lock" folder matching the purpose of the processing, i.e., disabling erasure of photographic data files, is created at the recording medium 5 in addition to the ordinary folder DSC01 in which photographic data files are stored while the recording medium 5 is initialized. As a result, locked files among numerous photographic data files can be identified with ease and accidental erasure of a necessary file that occurs when the photographer fails to set a lock can be prevented with a high degree of reliability. In addition, since files stored in the ordinary folder instead of the lock folder can be erased in a batch when deleting photographic data files, the operability improves.

In the embodiment explained before, images to be locked are selected from the plurality of images displayed in a batch in the reproduction mode. However, a lock may be set through the operating unit 3 as follows. A user confirms that the photographed image on the LCD display unit 6 is to be locked every photographing operation and then a lock operation may be performed through the operating unit 3 if the erasure of a given photographed image is necessitated. In such a case, if a lock is set, the write of the photographic data file into the ordinary folder is immediately halted and the photographic data file is instead written into the lock folder. Thus, the photographic data file can be directly written into the lock folder after the photographing operation so as to reduce consumption of battery power by minimizing unnecessary writing of data into the ordinary folder.

Figure 16:
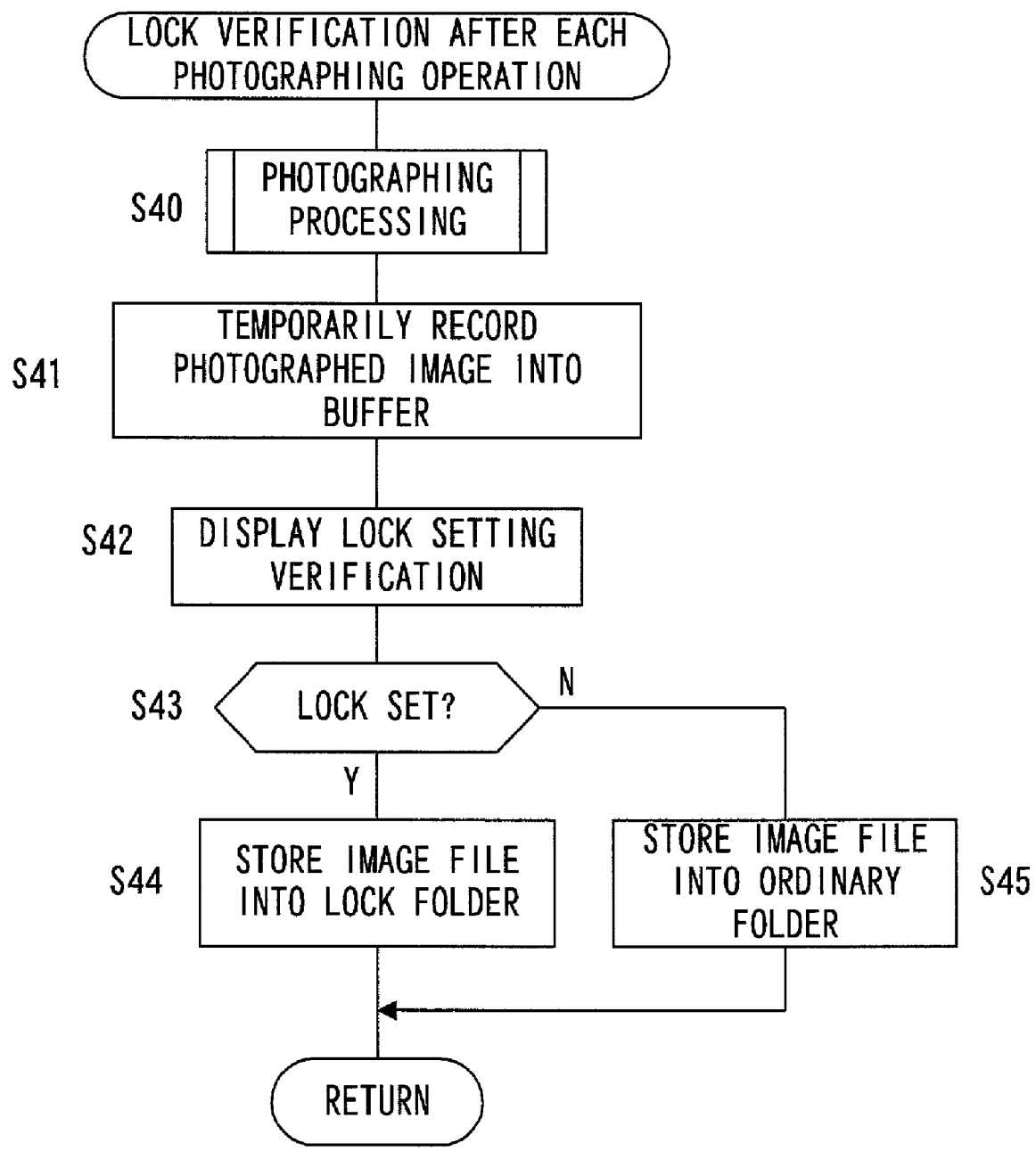
FIG. 16 presents a flowchart of an example of the procedure implemented to directly record a photographed image in appropriate folder after verifying whether or not erasure of each photographed image needs to be prohibited.

FIG. 16 presents a flowchart of an example of the processing during which a verification is made after each photographing operation as to whether or not the photographed image is to be designated a locked file. After a photographing operation is performed in step S40, the photographed image is temporarily stored into a buffer memory in step S41. Before the image is recorded into the recording medium 5, the item used to verify that a lock has been set setting is brought up on display at the display unit 6 in step S42. If it is decided in step S43 that the photographer has verified that a lock has been set through an operation of the operating unit 3, the operation proceeds to step S44. Instep S44, the photographed image which has been written into the buffer memory on a temporary basis is recorded into the recording medium 5. In this case, the image data file is stored into the lock folder at the recording medium 5. If, on the other hand, it is decided in step S43 that the photographer has not verified that a lock has been set through an operation of the operating unit 3, the operation proceeds to step S45. In step S45, the photographed image having been written in the buffer memory on a temporary basis is recorded into the recording medium 5. At this time, the image data file is stored into the ordinary folder at the recording medium 5.

In addition, a lock can be set in the single-frame reproduction mode in which a plurality of images that have been photographed and stored in the ordinary folder are reproduced one frame at a time as well. Since the lock is set by executing the operational procedure in the embodiment described above for each frame, a repeated explanation of the operation is omitted.

(Second Embodiment of the Invention)

In the first embodiment explained above, a special folder, i.e., the lock folder, as well as the ordinary folder, is created while initializing (formatting) the recording medium 5. In the second embodiment, on the other hand, only the ordinary folder is created during the initialization of the recording medium 5, a lock folder is created when a lock setting operation is performed for the first time while a photographed image is on display immediately after a photographing operation or when a lock setting operation is performed for the first time with regard to any reproduced image in either the single-frame reproduction mode or the multiple-frame reproduction mode and, subsequently, all photographic data files for which a lock is set are stored into the lock folder.

Figure 17:
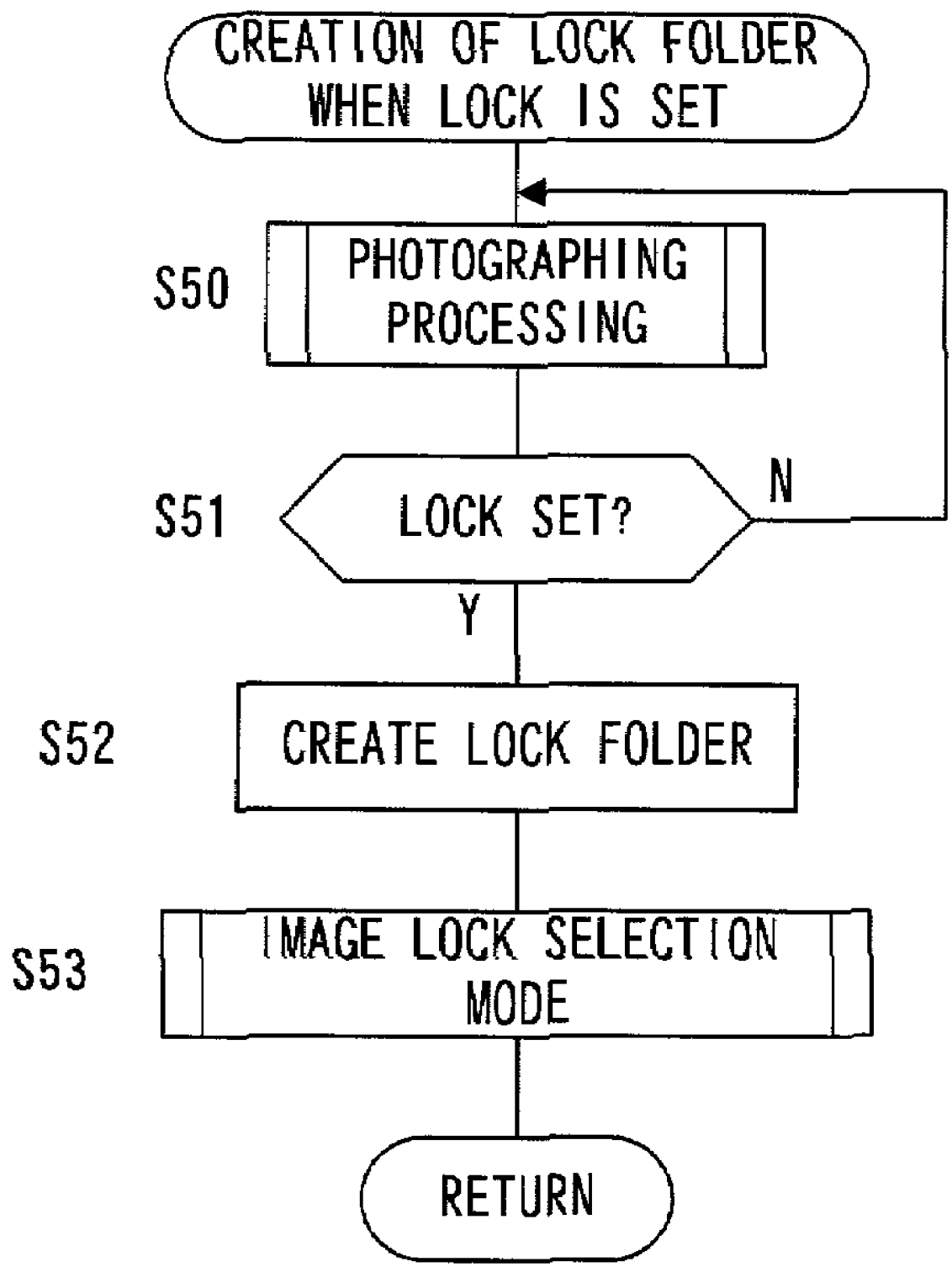
FIG. 17 presents a flowchart of an example of the procedure implemented to create a lock folder when lock setting processing is executed following a photographing operation.

FIG. 17 presents a flowchart of an example of the processing implemented to create a lock folder when a lock is set after a photographing operation and to record files to be locked into the lock folder. In step S50, photographing processing is executed and an image is recorded into the recording medium 5. If it is decided in step S51 based upon the display in the menu screen at the display unit 6 that the lock setting mode is currently set, the operation proceeds to step S52. In step S52, the lock folder is created at the recording medium 5. In step S53, the processing in the image lock selection mode is executed as shown in FIG. 15 and any image data file that is to be locked that is recorded in the ordinary folder is stored in the lock folder.

Since the second embodiment adopts structural and operational features identical to the features of the first embodiment except for those relevant to the timing with which the special folder is created, their explanation is omitted.

In addition to the advantages of the first embodiment, the second embodiment achieves an advantage in that since the lock folder is created only when it is necessary to set a lock, the special folder is not created unless necessary and thus unnecessary processing for managing the folder is eliminated.

(Third Embodiment of the Invention)

In the first and second embodiments, a lock folder is created as an example of the special folder matching a specific processing purpose. Now, an explanation is given on a special folder created for another processing purpose.

In the third embodiment, structural and operational features identical to the features of the first and second embodiments are adopted except for those relevant to the special folder created in correspondence to a different processing purpose, and for this reason their explanation is omitted.

When printing photographed images, a print specification may be made for each photographic data file and information including whether or not it is necessary to print photographing conditions such as the shutter speed and the aperture value and whether or not it is necessary to print the photographing date in addition to the number of prints can be set for each image. A "print" folder is created as the special folder to store photographic data files to undergo the print processing.

The print folder may be created when the recording medium 5 is initialized as in the case with the lock folder in the first embodiment, or it may be created when a print specifying operation is performed with regard to one of the photographed images instead of during the initialization as in the case of the lock folder in the second embodiment.

A print specification may be made for individual photographed images basically by adopting a method similar to the method of specifying a lock adopted in the first embodiment. In the single-frame reproduction mode, the menu button (not shown) at the operating unit 3 is operated to bring up the menu screen related to the image processing and then the "print" processing is selected and set by operating the switches 31~33 at the operating unit 3. In the reproduction mode for displaying a plurality of frames at once, on the other hand, the frame cursor 61 is moved to and set at the image to be printed by operating the switches 31~33 at the operating unit 3 as in the first embodiment explained earlier. Through such a print specifying operation, photographic data files specified to undergo the print processing are recorded into the print folder.

FIG. 11 shows the directory indicating that the "print" folder has been created in addition to the ordinary DSC01 folder. In this example, four photographic data files assigned with filenames 0002, 0003, 0004 and 0006 are stored in the ordinary DSC01 folder and two photographic data files assigned with filenames 0001 and 0005 are stored in the print folder.

As explained above, in the electronic camera 1 having the recording medium 5 in which a plurality of photographic data files are recorded, the special "print" folder matching the purpose of the processing, i.e., printing photographic data files, is created at the recording medium 5 as well as the ordinary folder DSC01 in which photographic data files are stored. As a result, it becomes possible to verify print specified files among numerous photographic data files with ease and, in addition, since the photographic data files stored in the print folder can be processed in a batch during the print operation, the operability improves.

It is to be noted that since it is not necessary to bring up the "print" menu on display in the menu screen related to the image processing in the reproduction mode for displaying print specified images in a batch, i.e., in the print image reproduction mode, the "print menu" either should not be displayed or should be displayed after all the other menus. In this manner, higher display priority is given to menus likely to be selected in the menu display in the print image reproduction mode to ultimately assure better operability.

(Fourth Embodiment of the Invention)

Photographed images can be transferred from the electronic camera to an external apparatus such as a personal computer by specifying individual photographic data files to be transferred. A "transfer" folder is created as a special folder for storing the photographic data files to undergo the transfer processing.

In the fourth embodiment, structural and operational features identical to the features of the first and second embodiments are adopted except for those relevant to the special folder created in correspondence to a different processing purpose, and for this reason, their explanation is omitted.

The transfer folder may be created when the recording medium 5 is initialized as in the case with the lock folder in the first embodiment, or it may be created when a transfer specifying operation is performed with regard to one of the photographed images instead of during the initialization as in the case of the lock folder in the second embodiment.

A transfer specification may be made for individual photographed images basically by adopting a method similar to the method of specifying a lock adopted in the first embodiment. In the single-frame reproduction mode, the menu button (not shown) at the operating unit 3 is operated to bring up the menu screen related to the image processing and then the "transfer" processing is selected and set by operating the switches 31~33 at the operating unit 3. In the reproduction mode for displaying a plurality of frames at once, on the other hand, the frame cursor 61 is moved to and set at the image to be transferred by operating the switches 31~33 at the operating unit 3 as in the first embodiment explained earlier. Through such a transfer specifying operation, photographic data files specified to undergo the transfer processing are recorded into the transfer folder.

FIG. 12 shows the directory indicating that the "transfer" folder has been created in addition to the ordinary DSC01 folder. In this example, four photographic data files assigned with filenames 0002, 0003, 0004 and 0006 are stored in the ordinary DSC01 folder and two photographic data files assigned with filenames 0001 and 0005 are stored in the transfer folder.

As explained above, in the electronic camera 1 having the recording medium 5 in which a plurality of photographic data files are recorded, the special "transfer" folder matching the purpose of the processing, i.e., transferring photographic data files, is created at the recording medium 5 as well as the ordinary folder DSC01 in which photographic data files are stored. As a result, it becomes possible to verify transfer specified files among numerous photographic data files with ease and, in addition, since the photographic data files stored in the transfer folder can be processed in a batch during the transfer operation, the operability improves.

It is to be noted that since it is not necessary to bring up the "transfer" menu on display in the menu screen related to the image processing in the reproduction mode for displaying transfer specified images in a batch, i.e., in the transfer image reproduction mode, the "transfer menu" either should not be displayed or should be displayed after all the other menus. In this manner, higher display priority is given to menus likely to be selected in the menu display in the transfer image reproduction mode to ultimately assure better operability.

(Fifth Embodiment of the Invention)

While photographic data files specified for a lock, a print or a transfer are moved from the ordinary folder to the special folder in the embodiments described above, these files may be copied instead of moving them.

Since the structural and operational features adopted in the fifth embodiment are identical to the features of the first and second embodiments explained earlier except for those related to photographic data file copying, their repeated explanation is omitted.

FIG. 13 shows the directory indicating that the print specified photographic data files 0001 and 0005 have been copied and stored into the print folder. In this example, the two print specified files 0001 and 0005 are stored in both the ordinary DSC01 folder and the print folder.

As explained above, since the special folder matching a given processing purpose is created and photographic data files stored in the ordinary folder are copied into the special folder, all the photographic data obtained through photographing operations can be verified in the ordinary folder and, at the same time, all the photographic data to undergo the same processing can be easily verified in the special folder. In addition, as all the photographic data to undergo the same processing can be processed in a batch, an improvement in operability is achieved.

It is to be noted that while the lock folder, the print folder and the transfer folder are created as special folders matching specific processing purposes in the embodiments explained above, the types of special folders that may be created are not limited to the examples in the embodiments. In addition, a special folder matching a combination of a plurality of processing purposes, e.g., a print/transfer folder for files to undergo printing processing and transfer processing, may be created.

(Sixth Embodiment of the Invention)

Now, an explanation is given on the sixth embodiment in which the type of processing that the image obtained through the next photographing operation is to undergo is determined prior to the actual photographing operation and the photographic data file is immediately stored into a special folder matching the processing purpose after the photographing operation.

Since the sixth embodiment adopts structural and operational features identical to the features of the first and second embodiments explained earlier except for those related to the specification of the type of processing that the photographed image is to undergo made prior to the photographing operation, their repeated explanation is omitted.

In the sixth embodiment, a photographing mode such as a lock mode, a print mode or a transfer mode that matches the processing purpose for the image to be photographed is set through the switches 31~33 at the operating unit 3 prior to the photographing operation. Once the photographing mode corresponding to the processing purpose is set, the control unit 4 creates a special folder corresponding to the processing purpose that has been set in addition to the ordinary folder DSC 01 at the recording medium 5. For instance, if the photographing mode for locking the image to be photographed is set before the photographing operation, a lock folder is created at the recording medium 5. If, on the other hand, the photographing mode for printing the image to be photographed is set to before the photographing operation, a print folder is created at the recording medium 5. If the photographing mode for transferring the image to be photographed is set prior to the photographing operation, a transfer folder is created at the recording medium 5, instead.

During the actual photographing operation, the photographic data file of the photographed image is not recorded into the ordinary folder DSC01 but instead is recorded into the special folder corresponding to the photographing mode that matches the processing purpose set prior to the photographing operation. For instance, if the lock photographing mode has been set before the photographing operation, the photographic data file of the photographed image is recorded into the lock folder. If the print photographing mode has been set prior to the photographing operation, the photographic data file of the photographed image is recorded into the print folder. If the transfer photographing mode has been set prior to the photographing operation, the photographic data file of the photographed image is recorded into the transfer folder.

Figure 18:
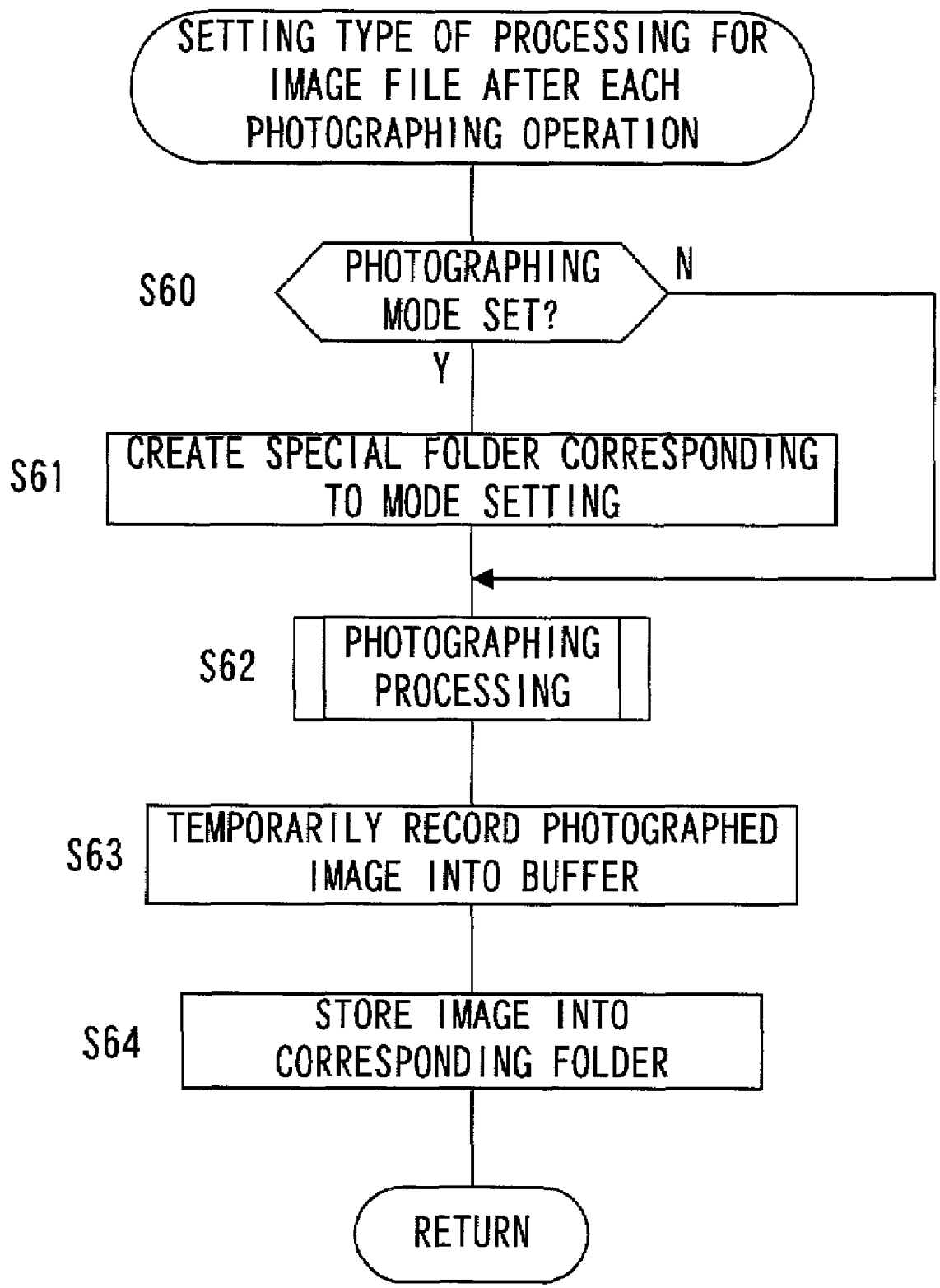
FIG. 18 presents a flowchart of an example of the procedure implemented to record individual photographed images into folders corresponding to photographing modes representing various processing purposes set prior to photographing operations.

FIG. 18 presents a flowchart of an example of the processing executed in the sixth embodiment. In step S60, the photographing mode is judged. In step S61, the appropriate special folder is created at the recording medium 5 in correspondence to the photographing mode. If a folder matching the photographing mode has already been created, no folder is created in step S61. In step S62, photographing processing is executed. In step S63, the photographed image is temporarily stored into the buffer memory. If a photographing operation is performed while the lock mode or the print mode is selected, the file of the photographed image is recorded into the corresponding folder in step S64. If no photographing mode has been set, the operation proceeds from step S60 to step S62, and the image is recorded in step S64. Namely, the image file is stored into the ordinary folder.

In the sixth embodiment, photographic data files can be each directly recorded into the folder matching the processing purpose immediately after the photographing operation. Therefore, if the type of processing that each photographed image is to undergo is determined in advance, the individual folders each containing corresponding photographed images can be immediately processed in a batch to achieve faster processing and an improvement in operability. In addition, since data are not written into the ordinary folder is unnecessary, no battery power is expended for file duplication and thus, the battery power is saved.

It is to be noted that if a lock folder is already present in the recording medium 5 undergoing the initialization process (formatting process), the photographic data files in the lock folder may be left intact instead of erasing them. In this manner, it can be ensured that photographic data files of important images can be left intact even after the recording medium 5 undergoes the initialization process.

The above described embodiments are examples and various modifications can be made without departing from the spirit and scope of the invention.

What is claimed is:

1. An electronic camera comprising:
   a folder creation means for creating an ordinary folder in which photographic information files of photographed images are stored and a special folder, corresponding to a processing purpose for a photographic information file, in which the photographic information file for which the processing purpose has been set, among the photographic information files of the photographed images, is stored, the ordinary folder and the special folder being created in a recording medium of the electronic camera and the processing purpose including a file processing purpose, and excluding a purpose for categorizing of a photographed image; and a control means for storing a photographic information file for which the processing purpose has been set into the corresponding special folder.

2. An electronic camera according to claim 1, wherein:
the folder creation means creates the special folder while initializing the recording medium.

3. An electronic camera according to claim 1, further comprising:
a first operating member that sets the processing purpose for photographic information file after a photographing operation, wherein:
when an operation to set a processing purpose is performed through the first operating member, the folder creation means creates a special folder corresponding to the processing purpose that has been set.

4. An electronic camera according to claim 3, wherein:
if a processing purpose is set through the first operating member by specifying a photographic information file among the photographic information files having been recorded in the ordinary folder, the control means moves or copies the specified photographic information file from the ordinary folder to the corresponding special folder.

5. An electronic camera according to claim 1, further comprising:
a second operating member that sets the processing purpose for the photographic information file prior to a photographing operation, wherein:
when an operation to set a processing purpose is performed through the second operating member, the folder creation means creates a special folder corresponding to the processing purpose that has been set.

6. An electronic camera according to claim 4, wherein:
the control means records a photographic information file of a photographed image into the special folder corresponding to the processing purpose set through the second operating member after the photographing operation.

7. An electronic camera according to claim 1, further comprising:
a reproduction mode setting means for setting a reproduction mode for displaying photographic information files stored in the special folder individually or for displaying the photographic information files stored in the special folder in a batch; and
a menu display means for bringing up a menu display in which a processing menu matching the processing purpose set for the special folder is excluded from processing menus for photographic information files or bringing up a menu display in which the processing menu matching the processing purpose is placed at a low position in the display priority order.

8. An electronic camera according to claim 1, wherein:
the special folder is constituted of any one of or plurality of folders in a combination of a lock folder for storing photographic information files to be protected, a print folder for storing photographic information files to undergo print processing and a transfer folder for storing photographic information files to be transferred to an external apparatus.

9. An electronic camera according to claim 3, wherein:
the special folder is constituted of any one of or plurality of folders in a combination of a lock folder for storing photographic information files to be protected, a print folder for storing photographic information files to undergo print processing and a transfer folder for storing photographic information files to be transferred to an external apparatus.

10. An electronic camera according to claim 4, wherein:
the special folder is constituted of any one of or plurality of folders in a combination of a lock folder for storing photographic information files to be protected, a print folder for storing photographic information files to undergo print processing and a transfer folder for storing photographic information files to be transferred to an external apparatus.

11. An electronic camera according to claim 5, wherein:
the special folder is constituted of any one of or plurality of folders in a combination of; a lock folder for storing photographic information files to be protected, a print folder for storing photographic information files to undergo print processing and a transfer folder for storing photographic information files to be transferred to an external apparatus.

12. An electronic camera according to claim 6, wherein:
the special folder is constituted of any one of or plurality of folders in a combination of; a lock folder for storing photographic information files to be protected, a print folder for storing photographic information files to undergo print processing and a transfer folder for storing photographic information files to be transferred to an external apparatus.

13. An electronic camera according to claim 7, wherein:
the special folder is constituted of any one of or plurality of folders in a combination of; a lock folder for storing photographic information files to be protected, a print folder for storing photographic information files to undergo print processing and a transfer folder for storing photographic information files to be transferred to an external apparatus.

14. A photographic information file management method for managing photographic image files in an electronic camera, comprising:
creating an ordinary folder in which photographic image files of photographed images are stored in a recording medium of the electronic camera;
creating a special folder in correspondence to a processing purpose for a photographic information file in the recording medium of the electronic camera, the photographic information file for which the processing purpose has been set, among the photographic information files of photographed images, being stored in the special folder, and the processing purpose including a file processing purpose, and excluding a purpose for categorizing of a photographed image; and
storing a photographic information file for which the processing purpose is set into the special folder.

15. A photographic information file management method for managing photographic information files in an electronic camera according to claim 14, wherein:
the special folder is created while initializing the recording medium.

16. A photographic information file management method for managing photographic information files in an electronic camera according to claim 14, wherein:
when the processing purpose for photographic information file is set after a photographing operation, a special folder matching the processing purpose that has been set is also created.

17. A photographic information file management method for managing photographic information files in an electronic camera according to claim 16, wherein:

when processing purpose is set by specifying a photographic information file among the photographic information files having been recorded in the ordinary folder, the specified photographic information file is moved or copied into the corresponding special folder from the ordinary folder.

18. A photographic information file management method for managing photographic information files in an electronic camera according to claim 14, wherein:
when the processing purpose for photographic information file is set before a photographing operation, a special folder corresponding to the processing purpose that has been set is also created.

19. A photographic information file management method for managing photographic information files in an electronic camera according to claim 18, wherein:
after a photographing operation, a photographic information file of a photographed image is recorded into the special folder matching the processing purpose having been set prior to the photographing operation.

20. A photographic information file management method for managing photographic information files in an electronic camera according to claim 14, wherein:
a reproduction mode in which the photographic images of the photographic information files stored in the special folder are displayed individually or in a batch is set; and
when the reproduction mode has been set, a menu excluding a processing menu matching the processing purpose set for the special folder from processing menus for photographic information file is displayed or a menu is displayed with display priority order for individual processing menus.

21. A photographic information file management method for managing photographic information files in an electronic camera according to claim 14, wherein:
the special folder is constituted of any one of or plurality of folders in a combination of; a lock folder for storing photographic information files to be protected, a print folder for storing photographic information files to undergo print processing and a transfer folder for storing photographic information files to be transferred to an external apparatus.

22. An electronic camera comprising:
a folder creation device that creates an ordinary folder in which photographic information files of photographed images are stored and a special folder, corresponding to a processing purpose for a photographic information file, in which the photographic information file for which the processing purpose has been set, among the photographic information files of the photographed images, is stored, the ordinary folder and the special folder being created in a recording medium of the electronic camera and the processing purpose including a file processing purpose, and excluding a purpose for categorizing of a photographed image; and
a controller that stores a photographic information file for which the processing purpose has been set into the corresponding special folder.

23. An electronic camera according to claim 22, wherein:
the folder creation device creates the special folder while initializing the recording medium.

24. An electronic camera according to claim 22, further comprising:
a first operating member that sets the processing purpose for photographic information file after a photographing operation, wherein:
when an operation to set a processing purpose is performed through the first operating member, the folder creation device creates a special folder corresponding to the processing purpose that has been set.

25. An electronic camera according to claim 24, wherein:
if a processing purpose is set through the first operating member by specifying a photographic information file among the photographic information files having been recorded in the ordinary folder, the controller moves or copies the specified photographic information file from the ordinary folder to the corresponding special folder.

26. An electronic camera according to claim 22, further comprising:
a second operating member that sets the processing purpose for the photographic information file prior to a photographing operation, wherein:
when an operation to set a processing purpose is performed through the second operating member, the folder creation device creates a special folder corresponding to the processing purpose that has been set.

27. An electronic camera according to claim 25, wherein:
the controller records a photographic information file of a photographed image into the special folder corresponding to the processing purpose set through the second operating member after the photographing operation.

28. An electronic camera according to claim 22, further comprising:
a reproduction mode setting device that sets a reproduction mode for displaying photographic information files stored in the special folder individually or for displaying the photographic information files stored in the special folder in a batch; and
a menu display that brings up a menu display in which a processing menu matching the processing purpose set for the special folder is excluded from processing menus for photographic information files or bringing up a menu display in which the processing menu matching the processing purpose is placed at a low position in the display priority order.

29. An electronic camera according claim 22, wherein:
the special folder is constituted of any one of or plurality of folders in a combination of; a lock folder for storing photographic information files to be protected, a print folder for storing photographic information files to undergo print processing and a transfer folder for storing photographic information files to be transferred to an external apparatus.

* * * * *